(12) United States Patent
Treudt et al.

(10) Patent No.: US 9,732,654 B2
(45) Date of Patent: Aug. 15, 2017

(54) DEVICE FOR STORAGE AND DELIVERY OF AN ADDITIVE FOR CATALYTIC DENITRIFICATION OF EXHAUST GASSES ON A MOTOR VEHICLE

(71) Applicant: Kautex Textron GmbH & Co. KG, Bonn (DE)

(72) Inventors: Volker Treudt, Windeck (DE); Thomas Wagner, Kerpen (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/435,322

(22) PCT Filed: Mar. 13, 2013

(86) PCT No.: PCT/EP2013/000743
§ 371 (c)(1),
(2) Date: Apr. 13, 2015

(87) PCT Pub. No.: WO2014/056554
PCT Pub. Date: Apr. 17, 2014

(65) Prior Publication Data
US 2015/0267588 A1    Sep. 24, 2015

(30) Foreign Application Priority Data

Oct. 12, 2012  (DE) .................... 10 2012 020 039

(51) Int. Cl.
*F01N 13/18*         (2010.01)
*F01N 3/28*          (2006.01)
*F01N 3/20*          (2006.01)

(52) U.S. Cl.
CPC ......... *F01N 3/2896* (2013.01); *F01N 3/2066* (2013.01); *F01N 13/18* (2013.01);
(Continued)

(58) Field of Classification Search
CPC ..... F01N 2610/1406; F01N 2610/1413; F01N 2610/1433; F02M 37/0088; F02M 37/103; F02M 37/106
See application file for complete search history.

(56) References Cited

U.S. PATENT DOCUMENTS 8,684,032 B2    4/2014  Bruck et al.
8,978,361 B2    3/2015  Bruck et al.
(Continued)

FOREIGN PATENT DOCUMENTS

DE    202005019499 U1    2/2006
DE    102009029304 A1    3/2011
(Continued)

OTHER PUBLICATIONS

English language PCT International Search Report mailed Oct. 14, 2013, received in corresponding PCT Application No. PCT/EP13/00743, 2 pgs.
(Continued)

*Primary Examiner* — Jonathan Matthias
(74) *Attorney, Agent, or Firm* — Grossman Tucker Perreault & Pfleger, PLLC

(57) ABSTRACT

The invention concerns a device for storage and delivery of an additive for catalytic denitrification of exhaust gasses on a motor vehicle. The device comprises a storage container (1) of thermoplastic material, with at least one component selected from a group comprising a delivery pump (7), a heating device, a filter element, a quality sensor and a fill level sensor, wherein the component is arranged inside the storage container (1) above an opening (9) and/or above an outer recess in a container floor (3).

9 Claims, 4 Drawing Sheets

(52) U.S. Cl.
CPC ...... *F01N 2530/18* (2013.01); *F01N 2610/02* (2013.01); *F01N 2610/1406* (2013.01); *Y02T 10/24* (2013.01)

(56) References Cited

U.S. PATENT DOCUMENTS

| | | |
|---|---|---|
| 2007/0023550 A1 | 2/2007 | Jakobi et al. |
| 2007/0157602 A1 | 7/2007 | Gschwind |
| 2011/0232271 A1 | 9/2011 | Haeberer |
| 2012/0006832 A1 | 1/2012 | Krause et al. |
| 2012/0311999 A1* | 12/2012 | Hodgson ............... F01N 3/2066 60/295 |
| 2012/0315196 A1* | 12/2012 | Maus .................... F01N 3/2066 422/174 |
| 2012/0321525 A1 | 12/2012 | Maus et al. |
| 2013/0025269 A1 | 1/2013 | Hodgson et al. |
| 2013/0233850 A1 | 9/2013 | Treudt |
| 2013/0263938 A1 | 10/2013 | Harr et al. |
| 2013/0334077 A1 | 12/2013 | Van Schaftingen et al. |

FOREIGN PATENT DOCUMENTS

| | | | |
|---|---|---|---|
| DE | 102009029378 A1 | 3/2011 | |
| DE | 102009054735 A1 | 6/2011 | |
| DE | 102010004614 A1 * | 7/2011 | ........... F01N 3/2066 |
| DE | WO 2011086038 A1 * | 7/2011 | ........... F01N 3/2066 |
| DE | 102010029636 A1 | 12/2011 | |
| DE | 102010039040 A1 | 2/2012 | |
| JP | 2006200521 A | 8/2006 | |
| JP | 2008241743 A | 10/2008 | |
| KR | 1020120112758 A | 10/2012 | |

OTHER PUBLICATIONS

English language PCT Written Opinion mailed Oct. 14, 2013, received in corresponding PCT Application No. PCT/EP13/00743, 5 pgs.

Chinese Office Action/Search Report dated Sep. 20, 2016 in Chinese Application No. 201380053547.1, 9 pgs.

\* cited by examiner

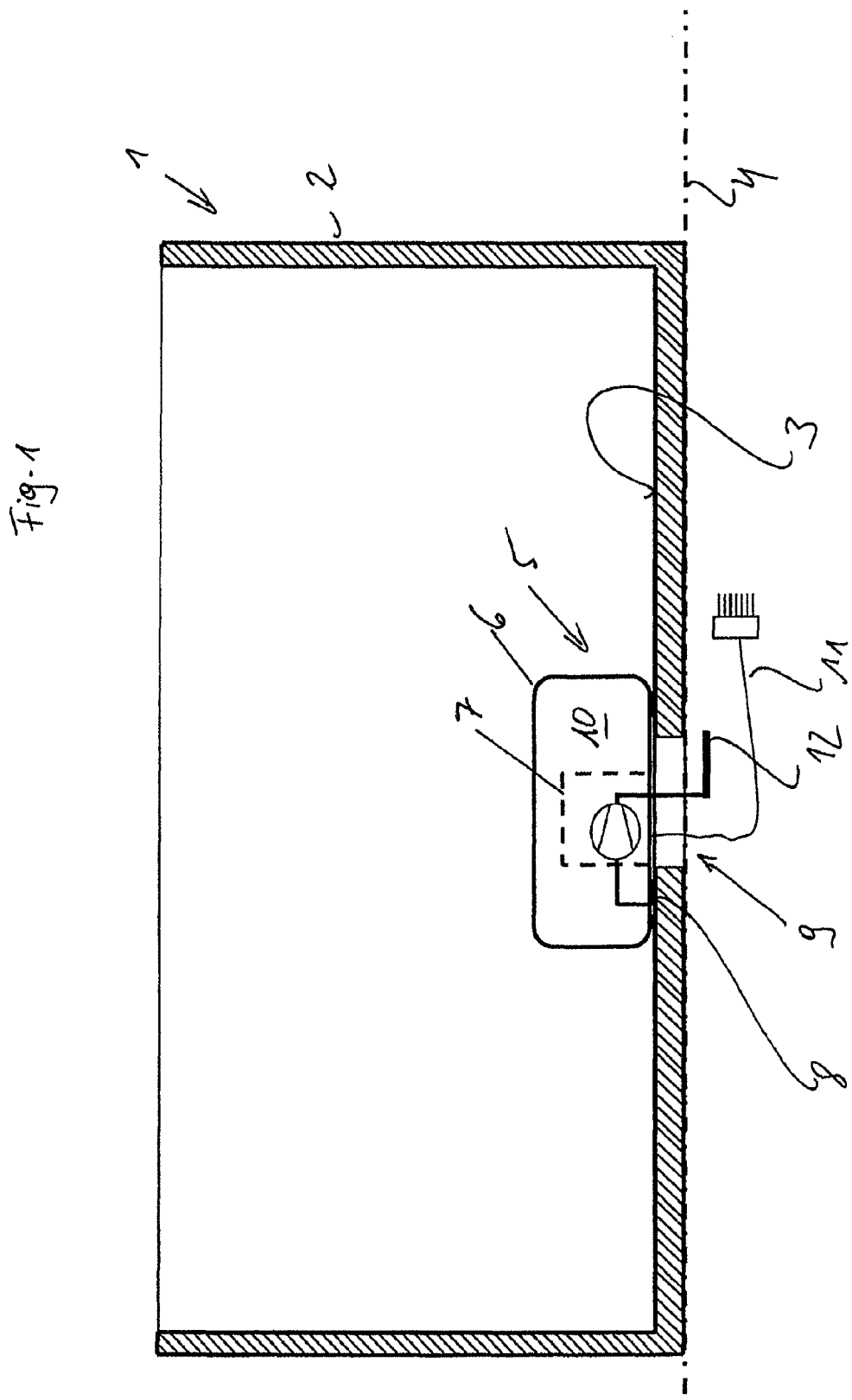

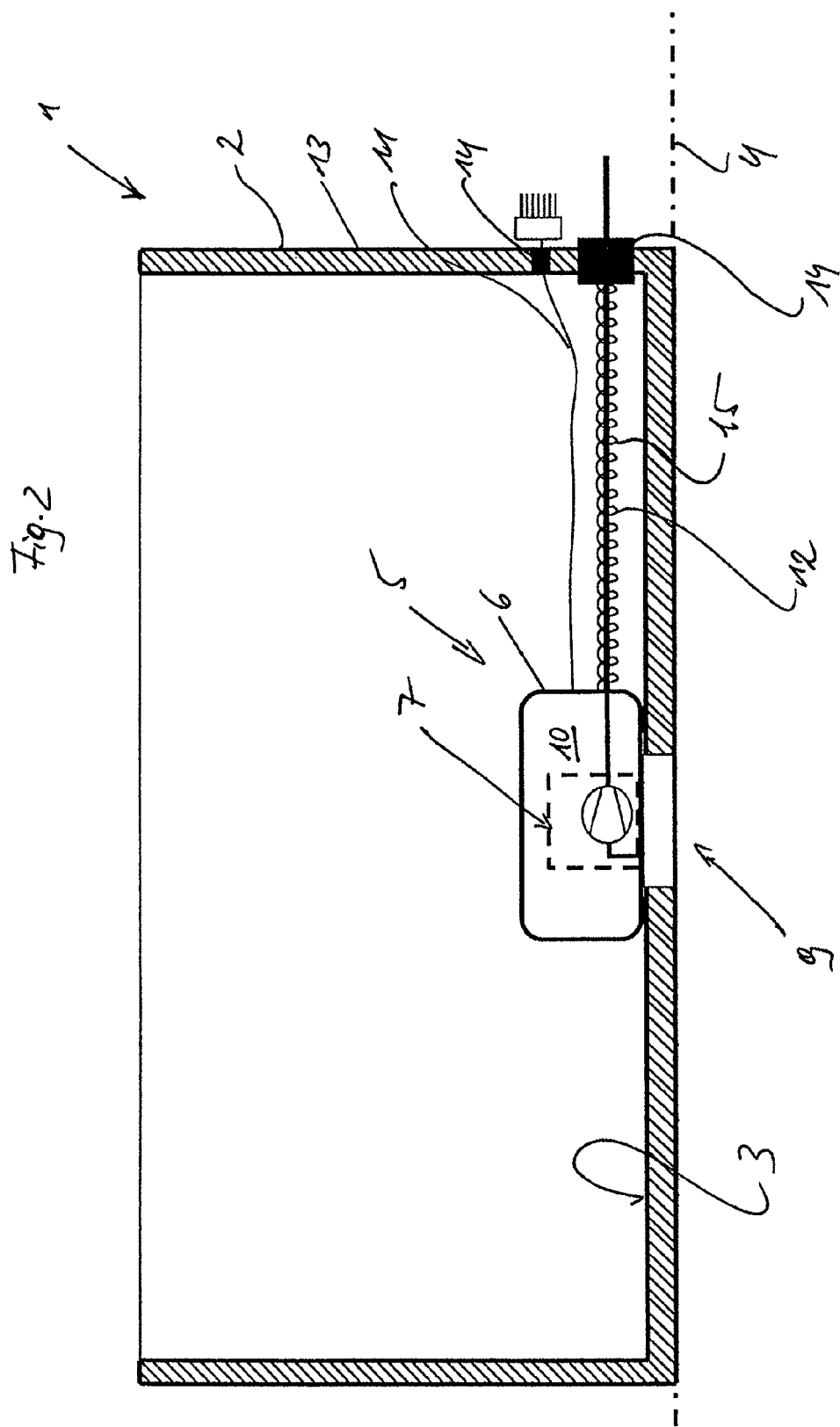

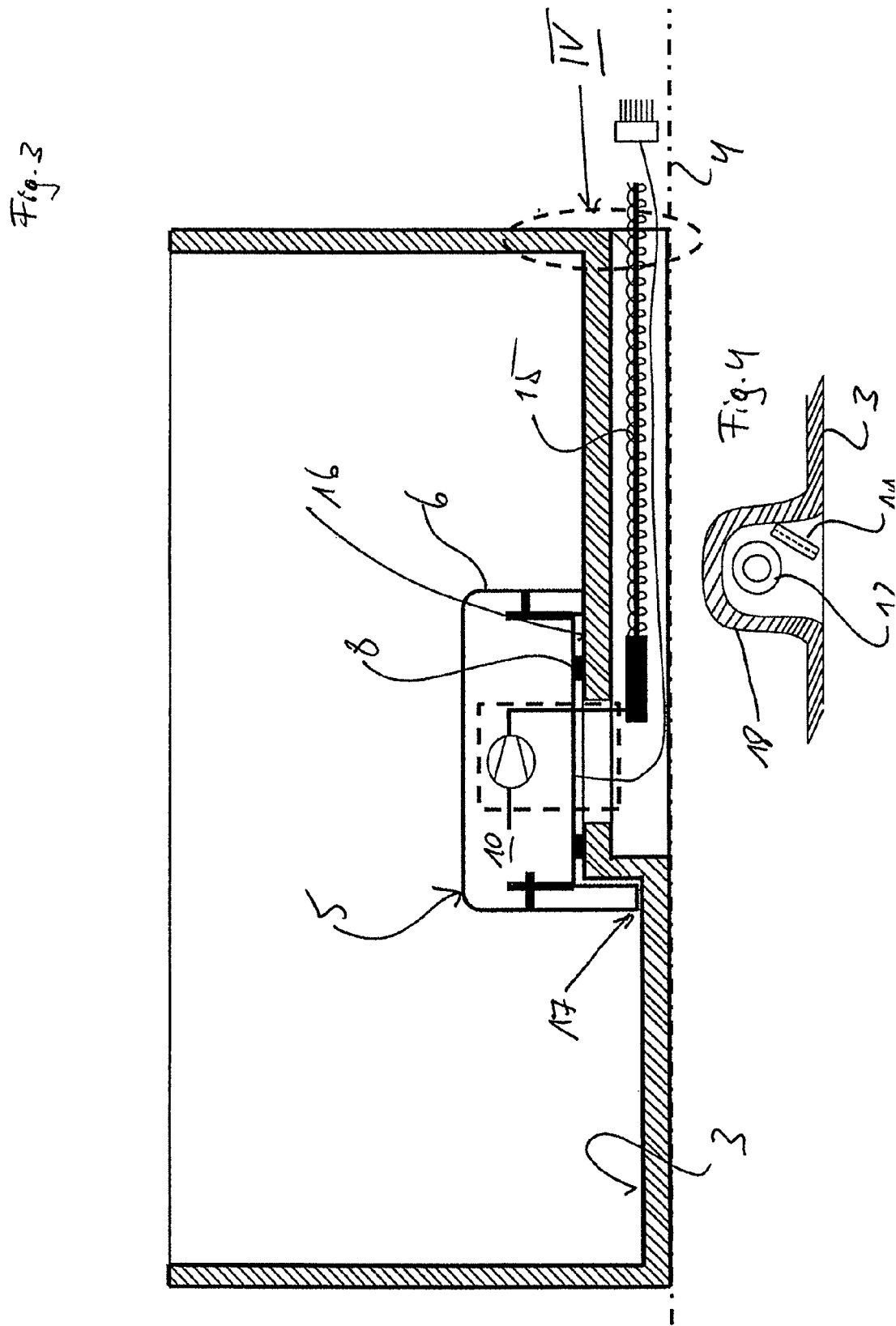

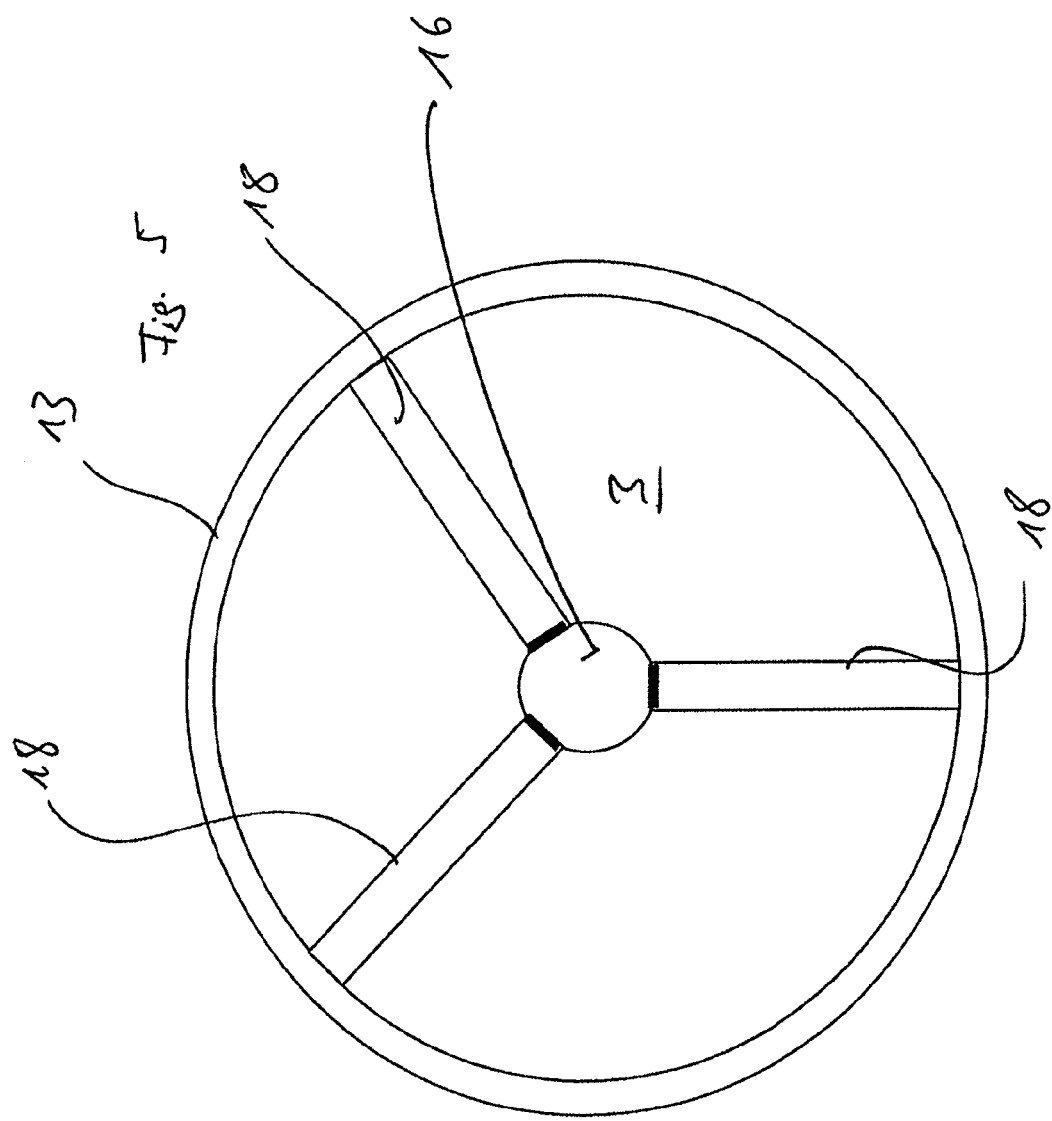

DEVICE FOR STORAGE AND DELIVERY OF AN ADDITIVE FOR CATALYTIC DENITRIFICATION OF EXHAUST GASSES ON A MOTOR VEHICLE

The invention concerns a device for storage and delivery of an additive for catalytic denitrification of exhaust gasses on a motor vehicle. Such a device is known for example from EP 1 767 417. This publication concerns a tank system to receive a urea solution for an SCR catalyst. The tank system comprises a main tank with a filling opening through which the tank interior of the main tank can be filled with urea solution. To ensure that operation of the fluid consumer is guaranteed shortly after the start of the motor vehicle even at ambient temperatures below the freezing point of the urea solution, in the tank system according to EP 1 767 417 a melt device is provided with a melt tank which surrounds a melt chamber, and an inlet opening through which the melt chamber can be filled with operating fluid from the tank interior, and an extraction opening which is connected with the environment of the tank system.

The system furthermore comprises a cold-start heater for melting operating fluid which has frozen in the melt chamber. The melt tank is arranged directly below the main tank on the floor of the main tank. By arranging the melt tank on the tank casing of the main tank, access to the mounted tank system is guaranteed. The system is substantially composed of separate modules as a tank system of modular construction, which brings certain benefits with regard to maintenance and variability.

In particular the arrangement of a melt tank and where applicable a heating device and a delivery pump on the tank casing of the main tank, outside the main tank, entails the disadvantage however that the melt volume, the pump and a heating device protrude in the direction of the ground clearance line of the system, which is associated with insufficient thawing power and is not optimum with regard to the use of construction space in the vehicle.

The term 'ground clearance line' in general means a constructionally predefined delimitation line of the construction space in a motor vehicle, which delimits the construction space for components—with the exception of the wheels—in the direction of the road surface.

An additive storage system of the type cited initially, in which parts of the components required for additive delivery are arranged inside the storage volume, is known for example from WO 2007/14312 A1. There for example parts of a delivery pump, a filter device and similar, which are known as active components, are pre-mounted on a base plate of the storage container. This base plate is mounted in a container opening such that the components mounted thereon are immersed in the storage container. Such a system has the disadvantage that the container geometry must largely be adapted to the base plate and that the flange delimiting the floor opening of the storage container must carry the entire arrangement.

WO 2012/085053 A1 discloses a storage system for an additive which comprises a container composed of injection-molded shells in which the "active components" are inserted. This system avoids the above-mentioned disadvantages but has the drawback that on the finished container, accessibility of the active components no longer exists under certain circumstances so that the active components must be designed for the life of the container.

The invention is therefore based on the object of providing a device for storage and delivery of an additive for catalytic denitrification of exhaust gasses on a motor vehicle, which firstly has a compact construction and guarantees good use of space in the installation position, and secondly fulfills the maintenance requirements for the components, which in particular allows exchangeability of components in case of maintenance.

The term 'good use of space in the installation position' in the sense of the present application means in particular that the volume of the storage container can be arranged as close as possible to the ground clearance line of the motor vehicle and that the construction space available for this in the motor vehicle can be utilized to the maximum for the volume of the storage container.

The object on which the invention is based is achieved by a device with the features of claim 1.

According to the invention in particular a device is provided for storage and delivery of an additive for catalytic denitrification of exhaust gasses on a motor vehicle, with a storage container of thermoplastic material, with at least one component selected from a group comprising a delivery pump, a heating device, a filter element, a quality sensor and a fill level sensor, wherein the component is arranged inside the storage container above an opening in a container floor.

Such an arrangement has the advantage that simple fixing of said components in the interior of the storage container is possible, for example by welding, screwing or by means of bayonet closure, and later accessibility of the components is guaranteed. In addition it is not necessary to structure the opening of the container floor specially to receive the components, i.e. to equip this with a fixing flange or other fixing means.

A preferred variant of the device according to the invention is distinguished in that the component is arranged in a module housing via which the component is inserted exchangeably from the outside through the opening in the container floor. This is particularly advantageous when the component is a delivery pump and/or a heating device, which may need to be replaced for maintenance or repair purposes.

The fixing within the storage container is suitably provided above an opening in the container floor such that the opening is sealed at the edge over the module housing so that the component can be installed and also de-installed from the outside through the opening in the container floor.

As the module housing is attached only to a container floor and no support is required or provided against an upper floor of the storage container, said housing can be constructed relatively compactly so that the module housing itself takes up little storage volume. In particular through the arrangement of the delivery pump and heating device recessed from the outside in the container floor, the storage container can be mounted relatively close to the ground clearance line in the motor vehicle.

In a particularly suitable and advantageous embodiment of the device according to the invention, the module housing is welded to the container floor on the inside of the container, preferably such that the container floor is sealed against the module housing on the periphery of the opening so that no additional sealant is required to seal the module housing against the container floor.

Alternatively the module housing can be glued or screwed or clipped to the inside of the container with the interposition of a sealant.

In a variant of the device according to the invention it is proposed that at least the metering line is guided out through the opening in the floor of the storage container.

The metering line itself is suitably also heatable.

Alternatively it can be provided that the metering line is guided out of the storage container through a further opening or passage in a container wall.

Suitably the module housing comprises a cavity which is arranged above the opening of the container floor and which is sealed to the storage container, wherein the delivery pump communicates with the storage container via at least one sealed passage in the cavity. The module housing can comprise a collection volume. The collection volume of the module housing can serve as a melt volume so that shortly after the start of the motor vehicle, a supply of additive to the consumer is guaranteed.

In a particularly advantageous and suitable embodiment of the device according to the invention, it is provided that in the container floor is provided at least one groove channel which extends from the opening of the container floor to a side wall and which receives at least the metering line. The metering line can for example be laid in the groove channel from the outside so that the metering line and where applicable the electrical connections and heating wires need not be laid through a separate opening in the container wall. Preferably the groove channel is formed by at least one rib of the container floor which reduces the storage volume. Such a depression or profiling of the container floor is associated with a minimum volume reduction of the storage volume and nonetheless allows the storage volume to be mounted as close as possible to the ground clearance line of the motor vehicle.

Suitably the module housing is arranged on a plinth formed by the container floor, in which for example the opening of the container floor is arranged.

In the container floor can be provided several groove channels forming ribs, of which at least one serves or is used for guiding the metering line. The other ribs can advantageously serve for mechanical reinforcement of the container floor against any ice pressure from frozen fluid.

The storage container according to the invention can be assembled for example from injection-molded or deep-drawn shells. Alternatively the storage container can be obtained by extrusion blowmolding of web-like preforms, wherein in this case the component can be introduced into the storage container during the production process. Such a configuration makes it relatively easy to attach the module housing to the container floor.

Laying of the metering line completely outside the storage container has the advantage that the number of heating circuits required can be restricted to a minimum so that a cold-start ability of the system is guaranteed relatively quickly.

The invention is now explained below with reference to various embodiment examples shown in the drawings.

These show:

FIG. 1 a highly diagrammatic section view through a device for storage and delivery of an additive according to a first variant of the invention, wherein for simplification reasons only part of the storage container is shown;

FIG. 2 a section view corresponding to FIG. 1 through a second variant of the device according to the invention;

FIG. 3 a simplified section view of a third variant of the invention;

FIG. 4 a detailed view along arrow IV in FIG. 3, and

FIG. 5 an internal view from above into the open storage container according to the variant in FIG. 3.

Reference is made first to FIG. 1. The device shown in parts there, for storage and delivery of an additive for catalytic denitrification of exhaust gasses, comprises a storage container 1 of thermoplastic material to receive a urea solution or another additive. The storage container 1 is composed of two shells which for example were obtained by injection molding of thermoplastic material, and of which in the figures only the lower shell 2 is shown. This forms a container floor 3 which in the installation position forms the underside of the storage container 1 and, as indicated in the figures, is arranged at approximately the height of the ground clearance line 4 of the motor vehicle.

Within the storage container 1, a delivery module 5 is mounted on the container floor 3 from the inside and comprises a module housing 6 and a delivery pump 7 as a subassembly. The module housing 6, which also preferably comprises thermoplastic material, is welded peripherally from the inside to the container floor 3 of the lower shell 2 of the storage container 1. The weld seam 8 is indicated in the figures.

The storage container 1 in the embodiment examples described has an approximately circular cross section. The invention should however be understood such that the cross section of the storage container 1 is not critical for the invention and can be arbitrary.

The delivery module 5 is arranged inside the storage container 1 above an opening 9 in the container floor 3. The module housing 6 on the side facing the container floor 3 is welded peripherally around the opening 9 so that the opening 9 with the module housing 6 is sealed against the volume of the storage container 1.

Within the module housing 6, the delivery pump 7 is inserted as a subassembly so that this can be inserted exchangeably in the delivery module 5 through the opening 9 of the container floor 3.

For this in the module housing 6 a pump cavity is provided which is open in the direction of the opening 9 and sealed to the collection volume 10 defined by the module housing 6. From the delivery pump 7, an electric line 11 and a metering line 12 are guided out of the storage container 1 through the opening 9.

FIG. 2 shows an alternative embodiment of the device shown in FIG. 1, wherein there the same components carry the same reference numerals.

The arrangement in FIG. 2 differs from that in FIG. 1 in that the metering line 12 and the electric line 11 are guided to the outside through a peripheral wall 13 of the storage container 1. For this sealed passages 14 are provided in the peripheral wall 13.

The metering line 12 is furthermore surrounded by a resistance heating element 15.

The resistance heating element 15 can for example be a wire helix in a plastic casing which surrounds the metering line 12.

A further variant of the device for storage of an additive according to the invention is shown as an example in FIG. 3. There the same components carry the same reference numerals.

This variant of the device according to the invention differs from the preceding variants in particular in that the container floor 3 of the storage container 1 has a topography such that a weld fixing plane 16 between the delivery module 5 and container floor 3 inside the storage container 1 is arranged higher than the lowest extraction plane 17. For this the delivery module 5 is welded on a plinth forming the weld fixing plane in the container floor 3, wherein the delivery module 5 can be adapted completely on the underside to the topography of the container floor 3 as shown in FIG. 3.

As in the preceding embodiment example, the delivery pump 7 is formed as a subassembly which can be exchanged through the opening 9.

A delivery pump module provided for this can for example communicate with the collection volume 10 with corresponding plug connections through sealed passages in a pump cavity of the module housing 6.

In the module housing 6 can be integrated one or more filter units which guarantee a filtered supply of additive from the volume of the storage container 1 to the collection volume 10.

In the embodiment example shown in FIG. 3, the metering line 12 with a resistance heating element 15 and an electric line 11 are connected to the delivery pump 7 outside the storage container 1 and laid below the container floor 3 in a groove channel 18 of the container floor 3.

The groove channel 18, as shown in FIG. 4 which indicates a cross section through the groove channel 18, is approximately U-shaped in cross section and embossed as a radially extending rib in the volume of the storage container 1.

The metering line 12 and electric line 11 are laid or clipped in the groove channel 18 from the outside.

As shown in FIG. 5, starting from the plinth-like weld fixing plane 16, in total three groove channels 18 are provided in the container floor 3 which extend in approximately a star pattern from the middle towards the outside. (In FIG. 3 the longitudinal section through the storage container 1 runs precisely through one groove channel 18).

The groove channels 18 can each receive lines, although ideally only a single groove channel 18 serves to receive lines, whereas the other groove channels simultaneously form ribs stabilizing the container floor 3. This serves to stabilize the container floor in particular against any freezing pressure because of the expanding fluid in the storage container 1.

In all variants described above the delivery module 5 comprises a heating device for melting of additive and/or for heating of additive within the collection volume 10. This heating device is not shown. The delivery module 5 can in addition comprise at least one leak sensor/quality sensor for the additive and at least one fill level sensor. Such a quality sensor generally means a sensor which allows detection of incorrect filling of the storage container 1, for example by detecting the density of the fluid contained.

LIST OF REFERENCE NUMERALS

1 Storage container
2 Lower shell
3 Container floor
4 Ground clearance line
5 Delivery module
6 Module housing
7 Delivery pump
8 Weld seam
9 Opening
10 Collection volume
11 Electrical line
12 Metering line
13 Peripheral wall
14 Passage
15 Resistance heating element
16 Weld fixing plane
17 Lowest extraction plane
18 Groove channel

What is claimed is:

1. A device to store and deliver an additive for catalytic denitrification of exhaust gasses on a motor vehicle, comprising:
   a storage container formed of thermoplastic material, the storage container having a container floor,
   at least one component arranged inside the storage container, the at least one component comprising at least one of a delivery pump, a heating device, a filter element, a quality sensor and a fill level sensor,
   wherein a housing formed separate from the storage container is disposed within the storage container and is connected fluid-tight to the container floor inside the storage container,
   wherein the component is assembled with the housing so as to be arranged inside the housing above an opening in the container floor and optionally above an outer recess in the container floor,
   wherein the housing has a housing opening which overlies the opening in the container floor,
   wherein the at least one component is removable from the housing from outside the container through the housing opening and the opening in the container floor and insertable into the housing from outside the container through the opening in the container floor and the housing opening, and
   wherein the at least one component resides within the housing when the housing opening and the opening in the container floor are each open to access of the at least one component.

2. The device as claimed in claim 1, further comprising a metering line, and wherein at least the metering line is guided out through the opening in the container floor.

3. The device as claimed in claim 1, further comprising a metering line, and wherein at least the metering line is guided out of the storage container through a further opening or passage in a container wall.

4. The device as claimed in claim 1, wherein the housing comprises a cavity which is arranged above the opening of the container floor, wherein the at least one component comprises the delivery pump and the delivery pump communicates with the storage container via sealed passages in the cavity.

5. The device as claimed in claim 1, further comprising a metering line, and wherein in the container floor includes at least one groove channel which extends from the opening of the container floor to a peripheral wall and which receives at least the metering line.

6. The device as claimed in claim 5, wherein the groove channel is formed by at least one rib of the container floor.

7. The device as claimed in claim 5, wherein the housing is arranged on a plinth formed by the container floor.

8. The device as claimed in claim 5, wherein the at least one groove channel comprises a plurality of groove channels, and wherein the plurality of groove channels each form a rib in the container floor, of which at least one of the ribs serves to guide and/or receive the metering line from outside the container.

9. The device as claimed in claim 1, wherein the housing comprises a cavity, and the cavity is open to access through the housing opening.

* * * * *